(12) United States Patent
Nickel et al.

(10) Patent No.: US 6,723,138 B2
(45) Date of Patent: Apr. 20, 2004

(54) PREPARATION OF DIKETOPYRROLOPYRROLE PIGMENTS

(75) Inventors: Uwe Nickel, Bad Homburg (DE); Leonhard Unverdorben, Nidderau (DE); Joachim Weber, Frankfurt am Main (DE); Erwin Dietz, Königstein (DE); Juergen Patzlaff, Rossdorf (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 10/383,025

(22) Filed: Mar. 6, 2003

(65) Prior Publication Data

US 2003/0158410 A1 Aug. 21, 2003

Related U.S. Application Data

(63) Continuation of application No. 09/874,689, filed on Jun. 5, 2001, now Pat. No. 6,566,519.

(30) Foreign Application Priority Data

Jun. 7, 2000 (DE) .......................................... 10028104

(51) Int. Cl.$^7$ ...................... C09B 57/00; C07D 487/02; C07D 403/14; B32B 3/00
(52) U.S. Cl. ...................... 8/637.1; 106/31.78; 428/166; 546/256; 546/276.7; 546/167; 544/336; 548/453
(58) Field of Search ................................. 544/336, 256, 544/276.7, 167; 548/453; 428/166; 106/31.78; 8/637.1

(56) References Cited

U.S. PATENT DOCUMENTS

| 4,415,685 A | 11/1983 | Iqbal et al. .................... 524/92 |
| 4,579,949 A | 4/1986 | Rochat et al. .............. 546/167 |
| 4,783,540 A | 11/1988 | Bäabler ...................... 548/453 |
| 4,810,304 A | 3/1989 | Jaffe et al. .................. 106/494 |
| 5,264,032 A | 11/1993 | Dietz et al. ................. 106/411 |
| 5,476,949 A | 12/1995 | Wallquist et al. ........... 548/453 |
| 5,492,564 A | 2/1996 | Wooden et al. ............. 106/493 |
| 5,534,328 A | 7/1996 | Ashmead et al. ........... 428/166 |
| 5,693,824 A | 12/1997 | Mizuguchi et al. ......... 548/453 |
| 5,708,188 A | 1/1998 | Hao et al. .................... 548/453 |
| 5,811,062 A | 9/1998 | Wegeng et al. ............. 422/129 |
| 5,871,575 A | 2/1999 | Ruch et al. .................. 106/498 |
| 6,057,449 A * | 5/2000 | Hendi et al. ............. 546/276.7 |
| 6,437,104 B1 | 8/2002 | Nickel et al. ................ 534/582 |
| 6,469,147 B2 | 10/2002 | Nickel et al. ................ 534/582 |

FOREIGN PATENT DOCUMENTS

| DE | 39 26 466 | 2/1991 |
| EP | 0 538 784 | 4/1993 |
| EP | 0 640 603 | 3/1995 |
| EP | 0 672 729 | 9/1995 |
| EP | 0 704 496 B1 | 4/1996 |
| EP | 0 704 497 B1 | 4/1996 |
| EP | 0 737 723 B1 | 10/1996 |
| EP | 0 794 235 B1 | 9/1997 |
| EP | 0 962 499 | 12/1999 |
| GB | 2 238 550 A | 6/1991 |

OTHER PUBLICATIONS

L.B. Schein, "Electrophotography and Development Physics", Springer Series in Electrophysics 14, Springer Verlag, 2$^{nd}$ edition, 1992.
J.F. Hughes, "Electrostatics Powder Coating" Research Studies, John Wiley & Sons 1984.
Derwent Abstract of EP 0 640 603.
Derwent Abstract of EP 0 672 729.
Derwent Abstract of EP 0 962 499.
Derwent Abstract of DE 39 26 466.
Derwent Abstract of EP 0 538784.
Lowe et al, 1999, Electrochimica Acta, 44, 3679–3689.
XP–001058349, Dr. Bernd Penth, "New Non–Clogging Microreactor for Chemical Processing and Nano Materials", Proceedings. Mircro. Tec. VDE World Microtechnologies Congress, Proceedings of International Conference on Microtechnologies, Bd. 1, Sep. 2000, pp. 401–405.

* cited by examiner

Primary Examiner—Robert W Ramsuer
Assistant Examiner—Andrea D. Small
(74) Attorney, Agent, or Firm—Susan S. Jackson; Anthony A. Bisulca (57) ABSTRACT

A process for preparing diketopyrrolopyrrole pigments comprises conducting the elementary steps of pigment synthesis (reaction and hydrolysis) in a miniaturized continuous reactor.

13 Claims, 1 Drawing Sheet

Fig. 1

PREPARATION OF DIKETOPYRROLOPYRROLE PIGMENTS

This application is a continuation of U.S. application Ser. No. 09/874,689, filed Jun. 5, 2001 now U.S. Pat. No. 6,566,519.

BACKGROUND OF THE INVENTION

The present invention relates to a process for preparing 1,4-diketopyrrolo[3,4-c]-pyrrole pigments in microreactors.

1,4-Diketopyrrolo[3,4-c]pyrrole pigments are known and can be used for pigmenting macromolecular organic materials. They have acquired immense industrial importance for pigmenting paints in particular. Their fastnesses and color properties therefore have to meet stringent requirements in commercial practice. This is why the production process is immensely important.

Production processes are described for example in U.S. Pat. Nos. 4,415,685 and 4,579,949. U.S. Pat. No. 4,579,949 describes a conventional batch process for preparing 1,4-diketopyrrolo[3,4-c]pyrrole pigments by reaction of dialkyl succinates with aromatic nitriles in the presence of strong bases in alcoholic solution or suspension and subsequent hydrolysis of the resultant salt.

EP-A-0 640 603 discloses a batch process for preparing highly transparent 1,4-diketopyrrolo[3,4-c]pyrrole pigments.

EP-A-0 672 729 discloses a batch process for preparing hiding 1,4-diketopyrrolo[3,4-c]pyrrole pigments.

EP-A-0 962 499 discloses a batch process for preparing 1,4-diketopyrrolo-[3,4-c]-pyrrole pigments using crystal growth inhibitors during the synthesis.

A feature common to these processes is the need to control the process parameters. For example, temperature at and duration of the addition of the individual reactants, supplementary stirring times and temperatures, hydrolysis temperature, suspension concentration during reaction and hydrolysis, use of further solvents (such as water and/or alcohols) and of acid in the hydrolysis are decisive for the fastnesses, the color properties of the pigments obtained and their quality constancy. A particular requirement is the need to exclude even traces of water until the hydrolysis stage. Moreover, the scale-up of new products from the laboratory scale to the large industrial scale is inconvenient with batch processes and can present problems, since for example vessel and stirrer geometries or heat transfers have a substantial effect on particle size, particle size distribution and color properties.

SUMMARY OF THE INVENTION

It is an object of the present invention to provide an environmentally friendly, economical and technically reliable process for preparing diketopyrrolopyrrole pigments that provides optimal mixing of the reactants and very constant adherence to the desired process parameters and simplifies the scale-up.

It is known to conduct certain chemical reactions in microreactors. Microreactors are constructed from stacks of grooved plates and are described in DE 39 26 466 C2 and U.S. Pat. No. 5,534,328. It is pointed out in U.S. Pat. No. 5,811,062 that microchannel reactors are preferably used for reactions that do not require or produce materials or solids that would clog the microchannels.

It has now been found that, surprisingly, microreactors are useful for preparing diketopyrrolopyrrole pigments.

As used here, the term "microreactor" is representative of micro- and minireactors which differ only by reason of the dimensions and construction of the reaction channel structures.

It is possible to use, for example, microreactors as known from the cited references or from publications of the Institut für Mikrotechnik Mainz GmbH, Germany, or else commercially available microreactors, for example Selecto™ (based on Cytos™) from Cellular Process Chemistry GmbH, Frankfurt/Main.

DESCRIPTION OF THE PREFERRED EMBODIMENTS

This invention accordingly provides a process for preparing 1,4-diketopyrrolo[3,4-c]-pyrrole pigments of the formula (I), (I)

hereinafter called diketopyrrolopyrrole pigments, where $R^1$ and $R^2$ are identical or different and are each an unsubstituted or substituted isocyclic or heterocyclic aromatic radical, by reaction of a succinic diester with a nitrile of the formula (II)

$$R_1-CN \qquad (II)$$

or of the formula (III)

$$R_2-CN \qquad (III)$$

or with a mixture of these nitriles, preferably with just one nitrile of formula (II) or of formula (III), in an organic solvent and in the presence of a strong base, and subsequent hydrolysis of the resultant salt of the diketopyrrolopyrrole pigment, which comprises conducting the reaction, or the hydrolysis, or the reaction and the hydrolysis, in a microreactor.

Advantageously, in the process of the invention, the materials used are continuously fed to the reactor in liquid or molten form or as solutions or suspensions. The conventional sequence of addition can be realized; similarly, the pigment dispersants or auxiliaries used in conventional processes may likewise be used in the process of the invention.

Preferred isocyclic aromatic $R^1$ and $R^2$ radicals are mono- to tetracyclic, especially mono- or bicyclic, radicals, for example phenyl, biphenyl and naphthyl.

Preferred heterocyclic aromatic $R^1$ and $R^2$ radicals are monocyclic to tricyclic and may additionally contain one or more fused benzene rings. The cyano group may be disposed not only on the heterocyclic but also on the isocyclic ring.

Examples of heterocyclic radicals are pyridyl, pyrimidyl, pyrazinyl, triazinyl, furyl, pyrrolyl, thiophenyl, quinolyl, coumarinyl, benzofuranyl, benzimidazolyl, benzoxazolyl, dibenzofuranyl, benzothiophenyl, dibenzothiophenyl, indolyl, carbazolyl, pyrazolyl, imidazolyl, oxazolyl, isoxazolyl, thiazolyl, indazolyl, benzothiazolyl, pyridazinyl, cinnolyl, quinazolyl, quinoxalyl, phthalazinyl, phthalazinedionyl, phthalamidyl, chromonyl, naphtholactamyl, quinolonyl, ortho-sulfobenzimidyl, maleimidyl, naphtharidinyl, benzimidazolonyl, benzoxazolonyl, benzothiazolonyl, benzothiazothionyl, quinazolonyl, quinoxalonyl, phthalazonyl, dioxopyrimidinyl, pyridonyl, isoquinolonyl, isoquinolinyl, isothiazolyl, benzisoxazolyl, benzisothiazolyl, indazolonyl, acridonyl, quinazolinedionyl, quinoxalinedionyl, benzoxazinedionyl, benzoxazinonyl and naphthalimidyl. The isocyclic and the heterocyclic aromatic radicals may contain customary substituents, for example:

(1) Halogen atoms, for example chlorine, bromine or fluorine atoms.

(2) Branched or unbranched alkyl groups containing 1 to 18, preferably 1 to 12, especially 1 to 8, particularly preferably 1 to 4, carbon atoms. These alkyl groups may in turn be substituted by one or more, for example 1, 2, 3, 4, or 5, substituents selected from the group consisting of F, OH, CN, —$OCOR^{16}$, $OR^{17}$, $COOR^{16}$, $CONR^{17}R^{18}$, and $R^{16}$—O-$CONHR^{16}$, where $R^{16}$ is alkyl, aryl, for example naphthyl, benzyl, halobenzyl, phenyl, halophenyl, alkoxyphenyl or alkylphenyl; or is a heterocyclic radical; $R^{17}$ and $R^{18}$ may be identical or different and denote hydrogen or alkyl, which alkyl may be substituted by cyano, hydroxyl or $C_5$–$C_6$-cycloalkyl, aryl or heteroaryl, particularly by phenyl or by halogen-, alkyl- or alkoxy-substituted phenyl, or $R^{17}$ and $R^{18}$ combine with the nitrogen atom to form a 5- or 6-membered heterocyclic ring, for example morpholine, piperidine or phthalimide. Further possible substituents on the alkyl groups are mono- or dialkylated amino groups, aryl radicals, such as naphthyl, phenyl, halophenyl, alkylphenyl or alkoxyphenyl, and also hetaromatic radicals such as 2-thienyl, 2-benzoxazolyl, 2-benzothiazolyl, 2-benzimidazolyl, 6-benzimidazolonyl, 2-, 3- or 4-pyridyl, 2-, 4- or 6-quinolyl. Alkyl has the meanings mentioned at the beginning of (2). Examples of unsubstituted and substituted alkyl groups are methyl, ethyl, n-propyl, isopropyl, n-butyl, sec-butyl, tert-butyl, tert-amyl, n-pentyl, n-hexyl, 1,1,3,3-tetramethylbutyl, n-heptyl, n-octyl, nonyl, decyl, undecyl, dodecyl, hydroxymethyl, trifluoromethyl, trifluoroethyl, cyanomethyl, methoxycarbonylmethyl, acetoxymethyl and benzyl.

(3) The alkoxy group —$OR^{19}$, where $R^{19}$ is hydrogen, alkyl or aryl, as defined above, $C_5$–$C_6$-cycloalkyl, aralkyl or a heterocyclic radical. Preferred $R^{19}$ radicals are methyl, ethyl, n-propyl, isopropyl, trifluoroethyl, phenyl, o-, m- or p-chlorophenyl, o-, m- or p-methylphenyl, alpha- or beta-naphthyl, cyclohexyl, benzyl, thienyl or pyranylmethyl.

(4) The group —$SR_{19}$, where $R_{19}$ is as defined under (3). Specific examples of $R_{19}$ are methyl, ethyl, n-propyl, isopropyl, phenyl, o-, m- or p-chlorophenyl, o-, m- or p-methylphenyl, α- or β-naphthyl, cyclohexyl, benzyl, thienyl or pyranylmethyl.

(5) The cyano group.

(6) The group of the formula —$NR_{17}R_{18}$, where $R_{17}$ and $R_{18}$ are each as defined under (2). Examples are amino, methylamino, dimethylamino, ethylamino, diethylamino, isopropylamino, β-hydroxyethylamino, β-hydroxypropyl-amino, N,N-bis(β-hydroxy-ethyl)amino, N,N-bis(β-cyanoethyl)amino, cyclohexylamino, phenylamino, N-methylphenylamino, benzylamino, dibenzylamino, piperidyl or morpholyl.

(7) The group of the formula —$COOR_{16}$, where $R_{16}$ is as defined under (2). Examples of $R_{16}$ are methyl, ethyl, isopropyl, tert-butyl, n-butyl, phenyl, benzyl or furfuryl.

(8) The group of the formula —$COR_{19}$, where $R_{19}$ is as defined under (3). Examples are methyl, ethyl, tert-butyl, phenyl, o-, m- or p-chlorophenyl, o-, m- or p-methylphenyl or α- or β-naphthyl.

(9) The group of the formula —$NR_{20}COR_{16}$, where $R_{16}$ is as defined under (2) and $R_{20}$ is hydrogen, alkyl, aryl, for example naphthyl or especially unsubstituted or halogen-, alkyl- or —O-alkyl-substituted phenyl, $C_5$–$C_6$-cycloalkyl, aralkyl or —$COR_{16}$, where two —$COR_{16}$ radicals may combine with the nitrogen atom to form a heterocyclic ring. Alkyl $R_{20}$ may for example have a number of carbon atoms specified as preferred under (2). Examples are acetylamino, propionylamino, butyrylamino, benzoylamino, p-chlorobenzoylamino, p-methylbenzoylamino, N-methylacetylamino, N-methyl-benzoylamino, N-succinimido or N-phthalimido.

(10) The group of the formula —$NR_{19}COOR_{16}$, where $R_{16}$ and $R_{19}$ are each as defined under (2) or (3). Examples are the groups —$NHCOOCH_3$, $NHCOOC_2H_5$ or $NHCOOC_6H_5$.

(11) The group of the formula —$NR_{19}CONR_{17}R_{18}$, where $R_{19}$, $R_{17}$ and $R_{18}$ are each as defined under (3) or (2). Examples are ureido, N-methylureido, N-phenylureido or N,N'-2',4'-dimethylphenylureido.

(12) The group of the formula —$NHSO_2R_{16}$, where $R_{16}$ is as defined under (2). Examples are methansulfonylamino, phenylsulfonylamino, p-tolylsulfonylamino or β-naphthylsulfonylamino.

(13) The groups of the formula —$SO_2R_{16}$ or —$SOR_{16}$, where $R_{16}$ is as defined under (2). Examples are methylsulfonyl, ethylsulfonyl, phenylsulfonyl, 2-naphthylsulfonyl, phenylsulfoxidyl.

(14) The group of the formula —$SO_2OR_{16}$, where $R_{16}$ is as defined under (2). Examples of $R_{16}$ are methyl, ethyl, phenyl, o-, m- or p-chlorophenyl, o-, m- or p-methylphenyl, α- or β-naphthyl.

(15) The group of the formula —$CONR_{17}R_{18}$, where $R_{17}$ and $R_{18}$ are each as defined under (2). Examples are carbamoyl, N-methylcarbamoyl, N-ethylcarbamoyl, N-phenylcarbamoyl, N,N-dimethylcarbamoyl, N-methyl-N-phenylcarbamoyl, N-∀-naphthylcarbamoyl, or N-piperidylcarbamoyl.

(16) The group of the formula —$SO_2NR_{17}R_{18}$, where $R_{17}$ and $R_{18}$ are each as defined under (2). Examples are sulfamoyl, N-methylsulfamoyl, N-ethylsulfamoyl, N-phenylsulfamoyl, N-methyl-N-phenylsulfamoyl or N-morpholylsulfamoyl.

(17) The group of the formula —N=N-$R_{21}$, where $R_{21}$ is the radical of a coupling component or an unsubstituted or halogen-, alkyl- or —O-alkyl-substituted phenyl radical. Alkyl $R_{21}$ may for example have a number of carbon atoms specified as preferred under (2). Examples of $R_{21}$ are acetoacetarylide, pyrazolyl, pyridonyl, o- or p-hydroxyphenyl, o-hydroxynaphthyl, p-aminophenyl or p-N,N-dimethylaminophenyl radicals.

(18) The group of the formula —$OCOR_{16}$, where $R_{16}$ is as defined under (2). Examples of $R_{16}$ are methyl, ethyl, phenyl, o-, m- or p-chlorophenyl.

(19) The group of the formula —$OCONHR_{16}$, where $R_{16}$ is as defined under (2). Examples of $R_{16}$ are methyl, ethyl, phenyl, o-, m- or p-chlorophenyl.

In a preferred embodiment of the process according to the invention, $R^1$ and $R^2$ are independently phenyl, phenyl substituted by 1 or 2 chlorine atoms, 1 or 2 methyl groups, methoxy, trifluoromethyl, cyano, methoxycarbonyl, tert-butyl, dimethylamino or cyanophenyl; naphthyl; biphenyl; pyridyl; pyridyl substituted by amyloxy; furyl or thienyl.

Very particularly preferably, $R^1$ and $R^2$ are each phenyl, 3 or 4-chlorophenyl, 3,5-dichlorophenyl, 4-methylphenyl, 4-methoxyphenyl, 3-trifluoromethylphenyl, 4-trifluoromethylphenyl, 3-cyanophenyl, 4-cyanophenyl, 4-methoxycarbonylphenyl, 4-methylphenyl, 4-tert-butylphenyl, 4-dimethylaminophenyl, 4-(p-cyanophenyl)-phenyl, 1- or 2-naphthyl, 4-biphenylyl, 2-pyridyl, 6-amyloxy-3-pyridyl, 2-furyl or 2-thienyl.

Preferably, compounds of the formula (I) are prepared according to the invention from a single nitrile of the formula (II) or (III). Preference is also given to using nitriles of the formulae (II) and/or (III) where $R^1$ and $R^2$ each have the preferred meanings mentioned above.

In particular, the starting materials employed are nitriles of the formula (IV)

(IV)

where $R_{22}$, $R_{23}$ and $R_{24}$ are independently hydrogen, fluorine, chlorine, bromine, carbamoyl, cyano, trifluoromethyl, $C_2$–$C_{13}$-alkylcarbamoyl, $C_1$–$C_{12}$-alkyl, $C_1$–$C_{12}$-alkoxy, $C_1$–$C_{12}$-alkylmercapto, $C_2$–$C_{13}$-alkoxycarbonyl, $C_2$–$C_{13}$-alkanoylamino, $C_1$–$C_{12}$-monoalkylamino, $C_2$–$C_{24}$-dialkylamino, unsubstituted or halogen-, $C_1$–$C_{12}$-alkyl- or $C_1$–$C_{12}$-alkoxy-substituted phenyl, phenylmercapto, phenoxycarbonyl, phenylcarbamoyl or benzoylamino, the alkyl and phenyl radicals are unsubstituted or substituted by halogen, $C_1$–$C_{12}$-alkyl or $C_1$–$C_{12}$-alkoxy, and at least one of $R_{22}$, $R_{23}$ and $R_{24}$ is hydrogen.

More particularly, the starting materials employed are nitriles of the formula (V)

(V)

where one of $R_{25}$ and $R_{26}$ is hydrogen, chlorine, bromine, $C_1$–$C_4$-alkyl, cyano, $C_1$–$C_4$-alkoxy, unsubstituted or chlorine-, methyl- or $C_1$–$C_4$-alkoxy-substituted phenyl, carbamoyl, $C_2$–$C_5$-alkylcarbamoyl, unsubstituted or chlorine-, methyl- or $C_1$–$C_4$-alkoxy-substituted phenylcarbamoyl and the other is hydrogen.

The succinic diesters to be used may be dialkyl, diaryl or monoalkyl monoaryl esters, among which the dialkyl and diaryl succinates may also be asymmetrical. However, preference is given to using symmetrical disuccinates, especially symmetrical dialkyl succinates. When a diaryl or monoaryl monoalkyl succinate is present, aryl is in particular unsubstituted phenyl or phenyl substituted by halogen, such as chlorine, $C_1$–$C_6$-alkyl, such as methyl, ethyl, isopropyl or tert-butyl, or $C_1$–$C_6$-alkoxy, such as methoxy or ethoxy. In the case of a dialkyl or monoalkyl monoaryl succinate, alkyl may be unbranched or branched, preferably branched, and preferably contain 1 to 18, especially 1 to 12, more preferably 1 to 8, particularly preferably 1 to 5, carbon atoms. Branched alkyl is preferably a sec- or tert-alkyl, such as isopropyl, sec-butyl, tert-butyl, tert-amyl or cyclohexyl.

Examples of succinic diesters are dimethyl succinate, diethyl succinate, dipropyl succinate, dibutyl succinate, dipentyl succinate, dihexyl succinate, diheptyl succinate, dioctyl succinate, diisopropyl succinate, di-sec-butyl succinate, di-tert- butyl succinate, di-tert-amyl succinate, di-[1,1-dimethylbutyl] succinate, di-[1,1,3,3-tetramethylbutyl] succinate, di-[1,1-dimethylpentyl] succinate, di-[1-methyl-1-ethylbutyl] succinate, di-[1,1-diethylpropyl] succinate, diphenyl succinate, di-[4-methylphenyl] succinate, di-[2-methylphenyl] succinate, di-[4-chlorophenyl] succinate, monoethyl monophenyl succinate, dicyclohexyl succinate. Particular preference is given to diisopropyl succinate.

The succinic diesters and the nitriles of the formula (II) and (III) are known compounds and preparable by known methods.

The ratio of nitrile to disuccinate used may vary, advantageously from 8 mol: 1 mol to 1 mol: 2 mol, preferably from 4 mol: 1 mol to 1 mol: 1 mol. The reaction of the disuccinate with the nitrile is carried out in an organic solvent. Examples of suitable solvents are primary, secondary or tertiary alcohols of 1 to 10 carbon atoms, such as methanol, ethanol, n-propanol, isopropanol, n-butanol, sec-butanol, tert-butanol, n-pentanol, 2-methyl-2-butanol, 2-methyl-2-pentanol, 3-methyl-3-pentanol, 2-methyl-2-hexanol, 3-ethyl-3-pentanol, 2,4,4-trimethyl-2-pentanol or glycols, such as ethylene glycol or diethylene glycol, or ethers, such as tetrahydrofuran or dioxane, or glycol ethers, such as ethylene glycol methyl ether, ethylene glycol ethyl ether, diethylene glycol monomethyl ether or diethylene glycol monoethyl ether, or dipolar aprotic solvents, such as acetonitrile, benzonitrile, dimethylformamide, N,N-dimethylacetamide, nitrobenzene, N-methylpyrrolidone; or aliphatic or aromatic hydrocarbons, such as benzene or alkyl-, alkoxy- or halogen-substituted benzene, such as toluene, xylene, anisole or chlorobenzene; or aromatic heterocycles, such as pyridine, picoline or quinoline. In addition, it is also possible to use the reactant nitrile of the formula (II) or (III) or the reactant disuccinate as solvent as well, if they are liquid in the temperature range in which the reaction is carried out. The solvents mentioned may also be used as mixtures. Advantageously 1.5 to 40, preferably 2 to 20, especially 2 to 10, parts by weight of solvent are used per part by weight of the sum total of the reactants (nitrile+disuccinate).

The process of the invention is preferably carried out in an alcohol, especially a secondary or tertiary alcohol, as solvent. Preferred tertiary alcohols are tert-butanol and tert-amyl alcohol. Also of interest in this connection are mixtures of these preferred solvents with aromatic hydrocarbons, such as toluene or xylene, or with halogen-substituted benzene, such as chlorobenzene.

The process of the invention is carried out in the presence of a strong base. Suitable strong bases are in particular alkali metal amides, such as lithium amide, sodium amide or potassium amide, or alkali metal hydrides, such as lithium hydride, sodium hydride or potassium hydride, or alkaline earth or alkali metal alkoxides derived in particular from primary, secondary or tertary aliphatic alcohols of 1 to 10 carbon atoms, for example lithium methoxide, sodium methoxide, potassium methoxide, lithium ethoxide, sodium ethoxide, potassium ethoxide, lithium n-propoxide, sodium n-propoxide, potassium n-propoxide, lithium isopropoxide, sodium isopropoxide, potassium isopropoxide, lithium n-butoxide, sodium n-butoxide, potassium n-butoxide, lithium sec-butoxide, sodium sec-butoxide, potassium sec-butoxide, lithium tert-butoxide, sodium tert-butoxide, potassium tert-butoxide, lithium 2-methyl-2-butoxide, sodium 2-methyl-2-butoxide, potassium 2-methyl-2-butoxide, lithium 2-methyl-2-pentoxide, sodium 2-methyl-2-pentoxide, potassium 2-methyl-2-pentoxide, lithium 3-methyl-3-pentoxide, sodium 3-methyl-3-pentoxide, potassium 3-methyl-3-pentoxide, lithium 3-ethyl-3-pentoxide, sodium 3-ethyl-3-pentoxide or potassium 3-ethyl-3-pentoxide. However, a mixture of the bases mentioned may also be used.

The strong base used in the process of the invention is preferably an alkali metal alkoxide where the alkali metal is in particular sodium or potassium and the alkoxide is preferably derived from a secondary or tertiary alcohol. Particularly preferred strong bases are therefore for example sodium isopropoxide, potassium isopropoxide, sodium sec-butoxide, potassium sec-butoxide, sodium tert-butoxide, potassium tert-butoxide, sodium tert-amyl oxide and potassium tert-amyl oxide. The strong base is advantageously used in an amount of 0.1 to 10 mol, preferably 1 to 5 mol, especially 1.9 to 4 mol, per mole of disuccinate.

The process of the invention may advantageously be carried out in the presence of pigment dispersants, preferably dispersants based on diketopyrrolopyrroles and quinacridones. These include for example compounds of the formula (IV)

(IV)

where $R^{30}$, $R^{40}$ and $R^{50}$ are identical or different and are each hydrogen, chlorine, bromine, fluorine, nitro, $C_1$–$C_6$-alkyl, $C_1$–$C_6$-alkoxy, benzoylamino, an isocyclic or heterocyclic aromatic radical, especially hydrogen or methyl, and Q is a quinacridone or diketopyrrolopyrrole radical, preferably a quinacridone radical which may be substituted by 1,2,3 or 4 substituents selected from the group consisting of F, Cl, Br, $C_1$–$C_4$-alkyl, $C_1$–$C_4$-alkoxy, carboxamido, which may be substituted by $C_1$–$C_6$-alkyl groups, and phenoxy; or a diketopyrrolopyrrole radical which may be substituted as just described, and m is from 0.1 to 4;

compounds of the formula (V)

(V)

where $R^{30}$, $R^{40}$, $R^{50}$, m and Q are each as defined above;

compounds of the formula (VI)

(VI)

where $R^{30}$, $R^{40}$, $R^{50}$, m and Q are each as defined above, $R^{60}$ has one of the meanings of $R^{30}$, $R^{40}$ or $R^{50}$, and preferably $R^{30}$ to $R^{60}$ are each hydrogen, methyl or chlorine;

compounds of the general formula (VII), (VII)

where

Q is as defined above;

s and n are independently from 0 to 4, but are not both zero;

$E^+$ is $H^+$ or the equivalent $M^{f+}/f$ of a metal cation $M^{f+}$ from main groups 1 to 5 or transition groups 1 or 2 or 4 to 8 of the periodic table of the chemical elements, f being 1, 2 or 3, for example $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$; an ammonium ion $N^+R^9R^{10}R^{11}R^{12}$, where $R^9$, $R^{10}$, $R^{11}$ and $R^{12}$ are each independently hydrogen atom, $C_1$–$C_{30}$-alkyl, $C_2$–$C_{30}$-alkenyl, $C_5$–$C_{30}$-cycloalkyl, phenyl, $(C_1$–$C_8)$-alkyl-phenyl, $(C_1$–$C_4)$-alkylene-phenyl, for example benzyl, or a (poly)alkyleneoxy group of the formula -[CH($R^{80}$)—CH($R^{80}$)—O]$_k$—H where k is from 1 to 30 and the two $R^{80}$ radicals are independently hydrogen, $C_1$–$C_4$-alkyl or, when k is >1, a combination thereof; and where alkyl, alkenyl, cycloalkyl, phenyl or alkylphenyl $R^9$, $R^{10}$, $R^{11}$, and/or $R^{12}$ may be substituted by amino, hydroxyl, and/or carboxyl; or where $R^9$ and $R^{10}$ may combine with the quaternary nitrogen atom to form a 5- to 7-membered saturated ring system containing, if desired, further heteroatoms from the group consisting of O, S and N, for example of the pyrrolidone, imidazolidine, hexamethyleneimine, piperidine, piperazine or morpholine type; or where $R^9$, $R^{10}$, and $R^{11}$ combine with the quaternary nitrogen atom to form a 5- to 7-membered aromatic ring system containing, if desired, further heteroatoms from the group consisting of O, S and N and to which additional rings may be fused if desired, for example of the pyrrole, imidazole, pyridine, picoline, pyrazine, quinoline or isoquinoline type;

or where $E^+$ defines an ammonium ion of the formula (VIIc), $$\left[\left(\begin{array}{c}R^{16}\\ \diagdown\\ N\\ \diagup\\ R^{15}\end{array}\!\!-\!T\!-\!\overset{R_{17}}{\underset{|}{N}}\!\!\!\!\!\!\!\!\!-_{q}R^{18}\right)H_p\right]^{p+} \quad (VIIc)$$

where $R^{15}$, $R^{16}$, $R^{17}$ and $R^{18}$ are independently hydrogen or a (poly)alkyleneoxy group of the formula —[CH($R^{80}$)—CH($R^{80}$)O]$_k$—H, where k is from 1 to 30 and the two $R^{80}$ radicals are independently hydrogen, $C_1$–$C_4$-alkyl or, when k is >1, a combination thereof;

q is from 1 to 10, preferably 1, 2, 3, 4 or 5;

p is from 1 to 5, subject to the proviso that p is $\leq$q+1;

T is a branched or unbranched $C_2$–$C_6$-alkylene radical; or where T, when q is >1, can also be a combination of branched or unbranched $C_2$–$C_6$-alkylene radicals;

and where the two Z radicals are identical or different and Z has the definition $Z^1$ or $Z^4$, where $Z^1$ is a radical of the formula (VIIb), $$-[X\text{-}Y]_q R^{91} \quad (VIIb)$$

where

X is a $C_2$–$C_6$-alkylene radical, a $C_5$–$C_7$-cycloalkylene radical or a combination thereof, which radicals may be substituted by 1 to 4 $C_1$–$C_4$-alkyl radicals, hydroxyl radicals, ($C_1$–$C_4$)-hydroxyalkyl radicals and/or by 1 to 2 further $C_5$–$C_7$-cycloalkyl radicals, or where X, when q is >1, can also be a combination of the meanings mentioned, Y is an —O—,

—N⟨_⟩N— or —$NR^{90}$ group, or where Y, when q is >1, can also be a combination of the meanings mentioned;

q is from 1 to 10, preferably 1, 2, 3, 4 or 5;

$R^{90}$ and $R^{91}$ are independently a hydrogen atom, a substituted or unsubstituted or fluorinated or perfluorinated, branched or unbranched ($C_1$–$C_{20}$)-alkyl group, a substituted or unsubstituted $C_5$–$C_7$-cycloalkyl group or a substituted or unsubstituted or fluorinated or perfluorinated ($C_2$–$C_{20}$)-alkenyl group, it being possible for the substituents to be hydroxyl, phenyl, cyano, chlorine, bromine, amino, $C_2$–$C_4$-acyl or $C_1$–$C_4$-alkoxy and to be preferably 1 to 4 in number, or $R^{90}$ and $R^{91}$ combine with the nitrogen atom to form a saturated, unsaturated or aromatic heterocyclic 5- to 7-membered ring which optionally contains 1 or 2 further nitrogen, oxygen or sulfur atoms or carbonyl groups in the ring, is optionally substituted by 1, 2 or 3 substituents selected from the group consisting of OH, phenyl, CN, Cl, Br, $C_1$–$C_4$-alkyl, $C_1$–$C_4$-alkoxy, $C_2$–$C_4$-acyl and carbamoyl, and optionally carries 1 or 2 benzo-fused saturated, unsaturated or aromatic carbocyclic or heterocyclic rings; and where $Z^4$ is hydrogen, hydroxyl, amino, phenyl, ($C_1$–$C_4$)-alkylene-phenyl, $C_5$–$C_7$-cycloalkyl or $C_1$–$C_{20}$-alkyl, it being possible for the phenyl ring, the ($C_1$–$C_4$)-alkylene-phenyl group and the alkyl group to be substituted by one or more, for example 1, 2, 3 or 4, substituents from the group consisting of Cl, Br, CN, $NH_2$, OH, $C_6H_5$, mono-, di- or tri-$C_1$–$C_4$-alkoxy-substituted $C_6H_5$, carbamoyl, $C_2$–$C_4$-acyl and $C_1$–$C_4$-alkoxy, for example methoxy or ethoxy, and it being possible for the phenyl ring and the ($C_1$–$C_4$)-alkylene-phenyl group to be substituted by $NR^{90}R^{91}$, $R^{90}$ and $R^{91}$ being as defined above, or the alkyl group is perfluorinated or fluorinated;

compounds of the formula (IX)

$$\text{(IX)}$$

[Structure showing a diketopyrrolopyrrole with $R^{15}$-substituted phenyl rings and Q—$CH_2$—N groups]

where $R^{15}$ is hydrogen, chlorine, bromine, fluorine, $C_1$–$C_6$-alkyl, $C_1$–$C_6$-alkoxy, phenyl, di-($C_1$–$C_6$-alkyl)amino, $C_1$–$C_6$-alkylthio, phenylthio or phenoxy, and preferably $R^{15}$ is attached to the phenyl ring in position 4, Q is as defined above, and the compound of the formula (IX) carries zero to 6 $SO_3^-E^+$ groups, where E is as defined above;

compounds of the formula (X)

$$\text{(X)}$$

[Imidazole structure with $R^{30}$, $R^{40}$, and $CH_2$—Q substituents, with subscript m]

where $R^{30}$, $R^{40}$, m and Q are each as defined above.

The process of the invention may further be carried out using the EP-A-0 538 784 saccharin-containing pigment dispersants, preferably based on quinacridones and diketo-pyrrolopyrroles.

The pigment dispersants described are advantageously used in a total of 0 to 40% by weight, preferably 0.1 to 35% by weight, especially 0.5 to 20% by weight, particularly preferably 1 to 15% by weight, based on the pigment yield at 100% conversion of the reactant (disuccinate or nitrile) used in deficiency.

The process of the invention may also utilize auxiliaries selected from the group consisting of surfactants, fillers, standardizers, resins, defoamers, dustproofing agents, extenders, shading colorants, preservatives, drying retarders, rheology control additives or a combination thereof.

Useful surfactants include anionic, cationic and nonionic substances or mixtures thereof.

Useful anionic substances include for example fatty acid taurides, fatty acid N-methyltaurides, fatty acid isethionates, alkylphenylsulfonates, alkylnaphthalenesulfonates, alkylphenol polyglycol ether sulfates, fatty alcohol polyglycol ether sulfates, fatty acid amide polyglycol ether sulfates, alkyl sulfosuccinamates, alkenylsuccinic monoesters, fatty alcohol polyglycol ether sulfosuccinates, alkanesulfonates, fatty acid glutamates, alkyl sulfosuccinates, fatty acid sarcosides; fatty acids, for example palmitic, stearic and oleic acid; soaps, for example alkali metal salts of fatty resins, naphthenic acids and resin acids, for example abietic acid, alkali-soluble resins, for example rosin-modified maleate resins and condensation products based on cyanuric chloride, taurine, N,N'-diethylaminopropylamine and p-phenylenediamine. Particular preference is given to resin soaps, i.e. alkali metal salts of resin acids.

Useful cationic substances include for example quaternary ammonium salts, fatty amine alkoxylates, alkoxylated polyamines, fatty amino polyglycol ethers, fatty amines, di- and polyamines derived from fatty amines or fatty alcohols and alkoxylates derived from these di- and polyamines, imidazolines derived from fatty acids, and salts of these cationic substances.

Useful nonionic substances include for example amine oxides, fatty alcohol polyglycol ethers, fatty acid polyglycol esters, betaines, such as fatty acid amide N-propylbetaines, phosphoric esters of fatty alcohols or fatty alcohol polyglycol ethers, fatty acid amide ethoxylates, fatty alcohol-alkylene oxide adducts and alkylphenol polyglycol ethers.

The total amount of the auxiliaries and pigment dispersants added may be in the range from 0 to 40% by weight, preferably from 0.5 to 20% by weight, particularly preferably from 1 to 15% by weight, based on the pigment yield at 100% conversion of the reactant (disuccinate or nitrile) used in deficiency.

In what follows, nitrile, ester, solvent, base, pigment dispersant and auxiliary are collectively referred to as input materials.

To carry out the reaction according to the invention, the input materials are introduced into a microreactor individually or as mixtures. In principle all conceivable combinations of the input materials are possible, provided the streams together contain all the input materials for use and are industrially handleable.

In a preferred embodiment of the present invention, two streams A and B are continuously introduced into the reactor and continuously mixed therein, so that the reaction takes place.

Preferred combinations are:

| Comb. | Stream A | Stream B |
| --- | --- | --- |
| 1. | Succinic ester | Nitrile and alkoxide in solvent |
| 2. | Succinic ester in solvent | Nitrile and alkoxide in solvent |
| 3. | Succinic ester and nitrile | Alkoxide in solvent |
| 4. | Succinic ester and nitrile in solvent | Alkoxide in solvent |
| 5. | Succinic diester and nitrile | Alkoxide |
| 6. | Succinic diester and nitrile in solvent | Alkoxide |

The above-described pigment dispersants, auxiliaries and/or mixtures of solvents may be present not only in stream A but also in stream B.

The preparation of mixtures of input materials to form streams of materials may also be carried out in advance in micromixers or in upstream mixing zones. It is also possible for input materials to be metered into downstream mixing zones or into downstream micromixers or -reactors.

The reaction is carried out at pressures between atmospheric pressure and 100 bar overpressure, preferably between atmospheric pressure and 25 bar. The temperature can lie within wide limits, preferably between 40 and 200° C., especially between 50 and 160° C., in particular between 80 and 130° C. The streams can also be fed to the microreactor at different temperatures.

To conduct the hydrolysis according to the invention, a reaction suspension formed from the reaction of the nitrile and the succinic ester and a hydrolyzant are continuously introduced into a microreactor and continuously mixed therein with each other, so that the hydrolysis takes place. The hydrolysis may also take place immediately following the microreactor reaction of nitrile and succinic ester, in a downstream, second microreactor, or by metering a hydrolyzant into the stream of the reaction suspension in a downstream mixing zone.

The hydrolyzants used are advantageously water, alcohols and/or acids and mixtures thereof and optionally further solvents as described above. Useful alcohols include for example $C_1$–$C_6$-alcohols such as methanol, ethanol, isopropanol, isobutanol, tert-butanol, and tert-amyl alcohol. The acids are for example inorganic acids, for example hydrochloric acid, phosphoric acid and preferably sulfuric acid, or aliphatic or aromatic carboxylic or sulfonic acids, for example formic acid, acetic acid, propionic acid, butyric acid, hexanoic acid, oxalic acid, benzoic acid, phenylacetic acid, benzenesulfonic acid or p-toluenesulfonic acid, preferably acetic acid and formic acid, or mixtures of acids.

It is advantageous to use in total 2.5% by weight to 20% by weight, preferably 4 to 15% by weight, of water, alcohol and/or solvent based on 1 part by weight of pigment salt for hydrolysis; when acid is used, it is advantageous to use 0.1 to 4, preferably 0.5 to 3, especially 0.5 to 2, equivalents, based on base.

The temperatures during the hydrolysis can vary within wide limits, advantageously between −25 and 200° C. Lower temperatures (below 80° C. from experience) tend to provide transparent pigments, while higher temperatures (above 80° C. from experience) tend to provide hiding pigments. The temperatures of the hydrolyzant and of the reaction suspension may also differ.

Sequential hydrolyses by repeated partial addition of one or more hydrolyzants are also possible. For the hydrolysis it is again possible to add pigment dispersants, auxiliaries and/or solvents before, during or after the hydrolysis in the microreactor, conventionally or in mixing zones or in microreactors.

When the hydrolysis is not carried out in a microreactor, it is effected by combining the suspension from the reaction of nitrile and succinic ester with the hydrolyzant by conventional processes.

Depending on the intended use, it can also be advantageous to prepare mixtures of compounds of the formula (I). This may be achieved for example by mixing various, separately prepared reaction solutions prior to hydrolysis or hydrolyzing them simultaneously; this can be effected conventionally or else in a micromixer.

The hydrolysis suspensions are worked up by known processes to isolate the pigment. Solvents can be recycled. It is also possible to subject the pigment in the hydrolysis suspension or after intermediate isolation to a customary finishing aftertreatment with water and/or a solvent, for example at temperatures of 20 to 180° C.

The pigment dispersants, auxiliaries and/or solvents may also be added before, during or after a conventional hydrolysis or aftertreatment.

A microreactor is constructed from a plurality of laminae which are stacked and bonded together and whose surfaces bear micromechanically created structures which interact to form spaces for chemical reactions. The system contains at least one continuous channel connected to the inlet and the outlet.

The flow rates of the streams are limited by the apparatus, for example by the pressures which result depending on the geometry of the microreactor. It is desirable for the microreactor reaction to proceed completely, but it is also possible to adjoin a delay zone to create a delay time that may be required.

The flow rates are advantageously between 0.05 ml/min and 5 l/min, preferably between 0.05 ml/min and 500 ml/min, particularly preferably between 0.05 ml/min and 250 ml/min, especially between 0.1 ml/min and 100 ml/min.

Figure 1:
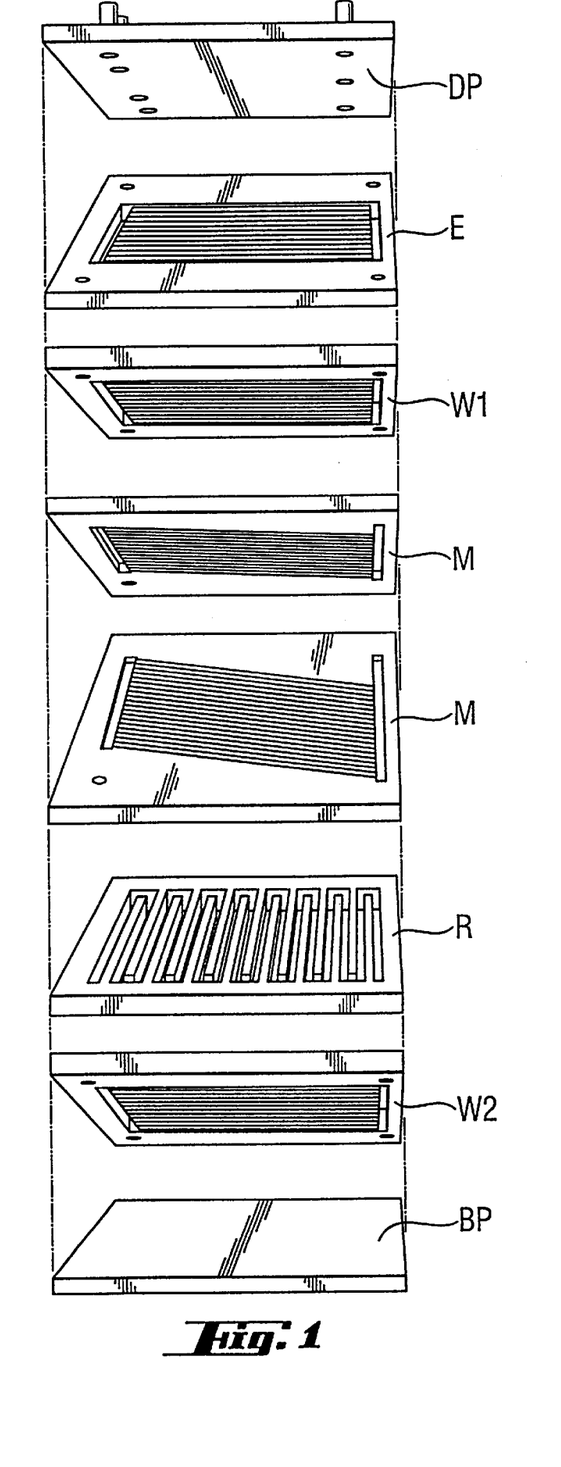
FIG. 1 is an exploded view of the microreactor system.

A microreactor useful for the elementary steps of preparing diketopyrrolopyrrole pigments is described in FIG. 1 by way of example. The present microreaction system is in this case constructed from six microstructured metal laminae, stacked and bonded together, plus a lid plate (DP) and a base plate (BP) to form a processing module that is firmly bonded or held under pressure by virtue of the assembly in order to compress sealing sheets between the plates. The present microreaction system includes two heat exchangers for cooling and/or heating medium, a mixing zone for the mixing of the reactants and a short delay zone. The heat exchanger (W1) preheats the streams flowing separately into plate (E). The streams are then mixed within the plates (M), which form a conjoint space. The delay zone (R) brings the reaction mixture to the desired reaction temperature with the aid of the heat exchanger (W2), so that the reaction in question can take place. The microreaction system is preferably operated continuously, and the quantities of materials that are mixed with each other are in the microliter ($\mu$l) to milliliter (ml) range.

The dimensions of the microstructured regions within a reactor are decisive for the preparation steps in the case of diketopyrrolopyrrole pigments. These dimensions have to be sufficiently large that, in particular, solid particles can pass through without problem and so not clog up the channels. The smallest clear width of the microstructures is advantageousley about ten times larger than the diameter of the largest particles. Furthermore, it is ensured, by appropriate geometric styling, that there are no dead water zones, for example dead ends or sharp corners, where for example particles could sediment. Preference is therefore given to continuous paths having round corners. The structures have to be sufficiently small to exploit the intrinsic advantages of microreaction technology, namely excellent heat control, laminar flow, diffuse mixing and low internal volume.

The clear width of the solution- or suspension-ducting channels is advantageously 5 to 10 000 $\mu$m, preferably 5 to 2 000 $\mu$m, particularly preferably 10 to 800 $\mu$m, especially 20 to 700 $\mu$m.

The clear width of the heat exchanger channels depends primarily on the clear width of the liquid- or suspension-ducting channels and is advantageously not more than 10 000 $\mu$m, preferably not more than 2 000 $\mu$m, especially not more than 800 $\mu$m. The lower limit of the clear width of the heat exchanger channels is uncritical and is at most constrained by the pressure increase of the heat exchanger fluid to be pumped and by the necessity for optimum heat supply or removal.

The dimensions of a microreaction system whose use is prefered, depicted in FIG. 1 by way of example, are:

| Heat exchanger structures | channel width | ~600 $\mu$m |
| | channel height | ~250 $\mu$m |
| Mixer | channel width | ~600 $\mu$m |
| | channel height | ~500 $\mu$m |

In the microreactor type described by way of example, the six superposed and closely conjoined metal laminae are preferably supplied with all heat exchanger fluids and reactants from above. The product and the heat exchanger fluids are also preferably removed upwardly. The possible supply of third and fourth input materials (e.g. water or solvent,) involved in the reaction is realized via a T-junction located directly upstream or downstream of the reactor. The requisite concentrations and flows are preferably controlled via precision piston pumps and a computer-controlled control system. The reaction temperature is monitored by integrated sensors and monitored and controlled with the aid of the control system and of a thermostat/cryostat.

The system depicted here is made of stainless steel; other materials, for example glass, ceramic, silicon, plastics or other metals, may also be used.

It is surprising and was unforeseeable that the preparation of diketopyrrolopyrrole pigments would be possible in this technically elegant manner, since it was hitherto assumed that the production of a solid material in the microreactor would lead to the system being clogged up. It was also unforeseeable that the reaction and hydrolysis would be able to be carried out without prior mechanical mixing, i.e., that the mixing that occurs in the microreactor would be sufficient.

Diketopyrrolopyrrole pigments prepared according to the invention are useful for pigmenting macromolecular natural or synthetic organic materials, for example cellulose ethers and esters, such as ethylcellulose, nitrocellulose, cellulose acetate, cellulose butyrate, natural resins or synthetic resins, such as addition polymerization resins or condensation resins, for example amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, gum, casein, silicone and silicone resins, individually or mixed.

It is immaterial in this connection whether the macromolecular organic compounds mentioned are present as plastically deformable masses, melts or in the form of spinning solutions, paints, coatings or printing inks. Depending on the intended use, it is found advantageous to use the pigments obtained according to the invention as blends or in the form of preparations or dispersions. Based on the macromolecular organic material to be pigmented, the pigments prepared according to the invention are used in an amount of preferably 0.05 to 30% by weight, preferably 0.1 to 15% by weight.

The pigments prepared according to the process of the invention can be used to pigment the industrially common baking varnishes from the class of the alkyd-melamine resin coatings, acrylic-melamine resin coatings, polyester coatings, high solids acrylic resin coatings, aqueous coatings based on polyurethane and also two-component coatings based on polyisocyanate-crosslinkable acrylic resins and especially automotive metallic coatings.

The pigments prepared according to the invention are also useful as colorants in electrophotographic toners and developers, for example one- or two-component powder toners (also known as one- or two-component developers), magnetic toners, liquid toners, polymerization toners and also specialty toners. Typical toner binders are addition polymerization, polyaddition and polycondensation resins, such as styrene, styrene-acrylate, styrene-butadiene, acrylate, polyester, phenol-epoxide resins, polysulfones, polyurethanes, individually or in combination, and also polyethylene and polypropylene, which may each include further ingredients, such as charge control agents, waxes or flow assistants, or are subsequently modified with these additives.

The pigments prepared according to the invention are further useful as colorants in powders and powder coatings, especially in triboelectrically or electrokinetically sprayable powder coatings used for surface coating of objects composed for example of metal, wood, plastic, glass, ceramic, concrete, textile material, paper or rubber.

Powder coating resins used are typically epoxy resins, carboxyl- and hydroxyl-containing polyester resins, polyurethane and acrylic resins together with customary hardeners. Combinations of resins are also used. For instance, epoxy resins are frequently used in combination with carboxyl- and hydroxyl-containing polyester resins. Typical hardener components (depending on the resin system) include for example acid anhydrides, imidazoles and also dicyandiamide and derivatives thereof, capped isocyanates, bisacylurethanes, phenolic and melamine resins, triglycidyl isocyanurates, oxazolines and dicarboxylic acids.

The pigments prepared according to the invention are also useful as colorants in inkjet inks having an aqueous or a nonaqueous basis and also in those inks which operate according to the hot-melt process.

The pigments prepared according to the invention are also useful as colorants for color filters and also for additive as well as subtractive color generation.

To evaluate the coatings sector properties of the pigments prepared according to the invention, a selection was made, from among the multiplicity of known varnishes, of an alkyd-melamine resin varnish (AM) containing aromatic components and based on a medium-oil alkyd resin and on a butanol-etherified melamine resin, a high-solids acrylic resin baking varnish based on a nonaqueous dispersion (HS) and an aqueous polyurethane-based aqueous varnish (PUR). The color strength and hue were determined in accordance with DIN 55986. Millbase rheology after dispersion was rated on the following five-point scale:

5 thin
4 fluid
3 thick
2 slightly set
1 set

Following dilution of the millbase to the final pigment concentration, the viscosity was assessed using a Rossmann viscospatula type 301 from Erichsen.

Gloss measurements were carried out on cast films at an angle of 20° in accordance with DIN 67530 (ASTMD 523) using a "multigloss" gloss meter from Byk-Mallinckrodt.

EXAMPLES

In the examples which follow, percentages are by weight.

Example 1 a) Amyl oxide solution (stream A):

124 g of sodium were introduced into 1365 g of anhydrous tert-amyl alcohol at 100° C. The mixture was intensively stirred under reflux until all of the sodium had reacted, and was then cooled down to 100° C. The amyl oxide solution is clear and colorless.

b) Stream B:

300 g of p-chlorobenzonitrile and 328.6 g of diisopropyl succinate were introduced into 800 g of anhydrous tert-amyl alcohol and dissolved therein at 90° C. The solution is slightly yellowish and clear.

c) Reaction in microreactor:

The two streams are pumped via calibrated piston pumps into the respective reactant inlets of the microreactor, stream A at a flow rate of 40 ml/min and stream B at a flow rate of 20 ml/min. The reaction to form the diketopyrrolopyrrole pigment salt takes place in the reactor space. The heat exchanger circuit of the microreactor is connected to a thermostat which maintains a reaction temperature of 106° C. The reaction suspension emerging from the reactor is poured onto hot water at 80° C. to hydrolyze the pigment salt. The pigment suspension is filtered off with suction, washed with methanol and then washed neutral with water. The moist C.I. Pigment Red 254 is dried at 80° C. The coating in AM varnish is hiding and strong in color.

What is claimed is:

1. A process for coloring a composition comprising adding at least one 1,4 diketopyrrolo[3,4-c]pyrrole pigment of the formula (I)

(I)

wherein $R^1$ and $R^2$ are identical or different and are each an unsubstituted or substituted isocyclic or heterocyclic aromatic radical, to a composition selected from the group consisting of an electrophotographic toner, an electrophotographic developer, a powder coating, an aqueous basis of an inkjet ink, a non-aqueous basis of an inkjet ink and a color filter, wherein the 1,4 diketopyrrolo[3,4-c]pyrrole pigment of the formula (I) is prepared by reacting a succinic diester with a nitrile of the formula (II)

$R^1$—CN (II)

or of the formula (III)

$R^2$—CN (III)

or with a mixture of these nitriles, in an organic solvent and in the presence of a strong base, and subsequently conducting hydrolysis of the resultant salt of the diketopyrrolopyrrole pigment, which comprises conducting the reaction, or the hydrolysis, or the reaction and the hydrolysis, in a microreactor having clear width channel dimensions between about 10 µm and about 800 µm.

2. The process of claim 1, wherein $R^1$ and $R^2$ are substituted or unsubstituted radicals selected from the group consisting of phenyl, biphenyl, naphthyl, pyridyl, pyrimidyl, pyrazinyl, triazinyl, furyl, pyrrolyl, thiophenyl, quinolyl, coumarinyl, benzofuranyl, benzimidazolyl, benzoxazolyl, dibenzofuranyl, benzothiophenyl, dibenzothiophenyl, indolyl, carbazolyl, pyrazolyl, imidazolyl, oxazolyl, isoxazolyl, thiazolyl, indazolyl, benzothiazolyl, pyridazinyl, cinnolyl, quinazolyl, quinoxalyl, phthalazinyl, phthalazinedionyl, phthalamidyl, chromonyl, naphtholactamyl, quinolonyl, ortho-sulfobenzimidyl, maleimidyl, naphtharidinyl, benzimidazolonyl, benzoxazolonyl, benzothiazolonyl, benzothiazothionyl, quinazolonyl, quinoxalonyl, phthalazonyl, dioxopyrimidinyl, pyridonyl, isoquinolonyl, isoquinolinyl, isothiazolyl, benzisoxazolyl, benzisothiazolyl, indazolonyl, acridonyl, quinazolinedionyl, quinoxalinedionyl, benzoxazinedionyl, benzoxazinonyl and naphthalimidyl.

3. The process of claim 1, wherein the reaction, the hydrolysis, or both, is conducted in the presence of a pigment dispersant based on diketopyrrolopyrroles or quinacridones.

4. The process of claim 1, wherein the succinic diester, the nitrile of the formula (II), (III), or (II) and (III), the strong base and optionally the pigment dispersant are introduced into the microreactor in liquid, molten, dissolved or suspended form and continuously mixed and reacted with each other in the microreactor.

5. The process of claim 1, wherein two streams A and B are introduced into the microreactor and continuously mixed, stream A being either (i) a liquid or molten succinic diester, (ii) a dissolved succinic diester, (iii) a liquid mixture or a suspension of succinic diester and the nitrile of the formula (II) and/or (III), or (iv) a solution of the mixture as per (iii); and stream B being in the case of (i) or (ii) a solution or suspension of nitrile and strong base and in the case of (iii) or (iv) a solution or melt of the strong base.

6. The process of claim 1, wherein the reaction of the succinic diester with the nitrile of formula (II) and/or (III) takes place at a temperature between 40 and 200° C.

7. The process of claim 1, wherein a suspension of the resultant salt of the diketopyrrolopyrrole pigment and a hydrolyzant are introduced into a microreactor in dissolved, liquid or suspended form and continuously mixed and reacted with each other in the microreactor.

8. The process of claim 1, wherein the hydrolysis is conducted using water, a $C_1$–$C_6$-alcohol, an inorganic or organic acid or a mixture thereof.

9. The process of claim 1, wherein the hydrolysis is conducted in a downstream microreactor at temperatures between −25° C. and +200° C.

10. The process of claim 1, wherein the reaction of the succinic diester with the nitrile of formula (II) and/or (III) takes place in a first microreactor and the hydrolysis of the diketopyrrolopyrrole pigment salt formed in this first reactor takes place in a second, downstream microreactor.

11. The process of claim 1, wherein the introduced liquids or suspensions are brought to and maintained at reaction temperature in the interior of the microreactor by means of one or more heat exchangers.

12. The process of claim 1, wherein the liquids or suspensions are passed through the microreactor in a continuous path with rounded corners.

13. The process of claim 1, wherein sensors and control circuits integrated in the microreactor capture and control concentrations, flow rates and temperatures in the microreactor.

* * * * *